United States Patent [19]

Breckel et al.

[11] Patent Number: 4,913,487

[45] Date of Patent: Apr. 3, 1990

[54] AIRCRAFT WORKSTATION WHICH IS CONVERTIBLE BETWEEN A FLIGHT ATTENDANT'S SEAT AND A COMPUTER TERMINAL

[75] Inventors: David A. Breckel, Bellevue; Michael A. Ritts, Issaquah, Wash.

[73] Assignee: The Boeing Company, Seattle, Wash.

[21] Appl. No.: 332,134

[22] Filed: Apr. 3, 1989

[51] Int. Cl.$^4$ ............................. A47C 9/06; B60N 1/10
[52] U.S. Cl. ........................................ 297/14; 297/147; 297/423
[58] Field of Search ................. 297/14, 147, 125, 408, 297/591, 423

[56] References Cited

U.S. PATENT DOCUMENTS

| | | | |
|---|---|---|---|
| 361,882 | 4/1887 | Luff | 297/125 |
| 1,516,763 | 11/1924 | Dexter | 297/14 |
| 2,427,121 | 9/1947 | Bohmer | 297/147 X |
| 2,547,808 | 4/1951 | Burrage | 297/147 X |
| 2,796,115 | 6/1957 | Bruchtel | 297/147 |
| 3,019,050 | 1/1962 | Spielman | 297/217 |
| 3,093,414 | 6/1963 | Eames et al. | 297/323 |
| 3,336,076 | 8/1967 | Malitte | 297/148 |
| 3,594,037 | 7/1971 | Sherman | 297/14 |
| 3,669,493 | 6/1972 | Vowles | 297/423 X |
| 4,328,991 | 5/1982 | Mengshoel et al. | 297/423 X |
| 4,460,215 | 7/1984 | Chamberlain et al. | 297/14 |
| 4,527,828 | 7/1985 | Groce et al. | 297/14 X |
| 4,536,027 | 8/1985 | Brennan | 297/124 |
| 4,650,249 | 3/1987 | Serber | 297/423 X |
| 4,664,443 | 5/1987 | Casabe | 297/408 |
| 4,679,749 | 7/1987 | Ryan et al. | 244/122 R |

Primary Examiner—Francis K. Zugel
Attorney, Agent, or Firm—Robert H. Sproule; B. A. Donahue

[57] ABSTRACT

A workstation located in the cabin of a passenger aircraft is convertible between (i) a stowed position which occupies a minimum amount of space, (ii) a seat for a flight attendant, and (iii) a computer workstation which can be utilized by a flight attendant while standing or while seated.

6 Claims, 5 Drawing Sheets

AIRCRAFT WORKSTATION WHICH IS CONVERTIBLE BETWEEN A FLIGHT ATTENDANT'S SEAT AND A COMPUTER TERMINAL

TECHNICAL FIELD

The present invention pertains to an aircraft cabin workstation which can be converted from a stowed position into a flight attendant's seat or a computer terminal.

BACKGROUND OF THE INVENTION

In modern passenger aircraft it is desirable to provide the flight attendants with access to a computer terminal. Access to a computer terminal not only allows the flight attendants to perform many of their present tasks more efficiently, but it also allows the flight attendants to provide additional services. For example, a computer terminal could be used to either regulate or to check the status of various aircraft systems such as the cabin lighting or the amount of potable water on board. Other potential uses of an onboard computer terminal include information storage and retrieval pertaining to airline flight-schedules, status of connecting flights, present inventory of food and beverage, as well as on board sales of beverages. In the future, the computer terminal could be tied into individual monitors located at the passengers seats.

SUMMARY OF THE INVENTION

The present invention pertains to a multi-function workstation for an aircraft cabin. The workstation includes a frame which forms an enclosure. Attached to the frame is a lower seat panel which is movable between a vertical stowed position inside the frame enclosure, and a substantially horizontal position. When the seat panel is in the horizontal position, it can be used for seating a flight attendant.

Also included in the workstation is an upper head panel which is attached to the frame above the seat panel. The upper head panel is movable between a vertical stowed position inside the frame enclosure, and a substantially horizontal position. The head panel includes cushion on a first side which acts as a headrest when the head panel is in the vertical stowed position. This is necessary when the workstation is being used as a flight attendant's seat. The head panel also includes a receptacle located on its other side which supports a computer keyboard when the head panel is in the horizontal position. This allows the work station to be used in a computer terminal mode.

Other details of the convertible workstation will be explained hereinafter.

BRIEF DESCRIPTION OF THE DRAWINGS

The present invention will be explained in further detail in the following detailed description in connection with the attached drawings, in which.

DETAILED DESCRIPTION

Figure 1:
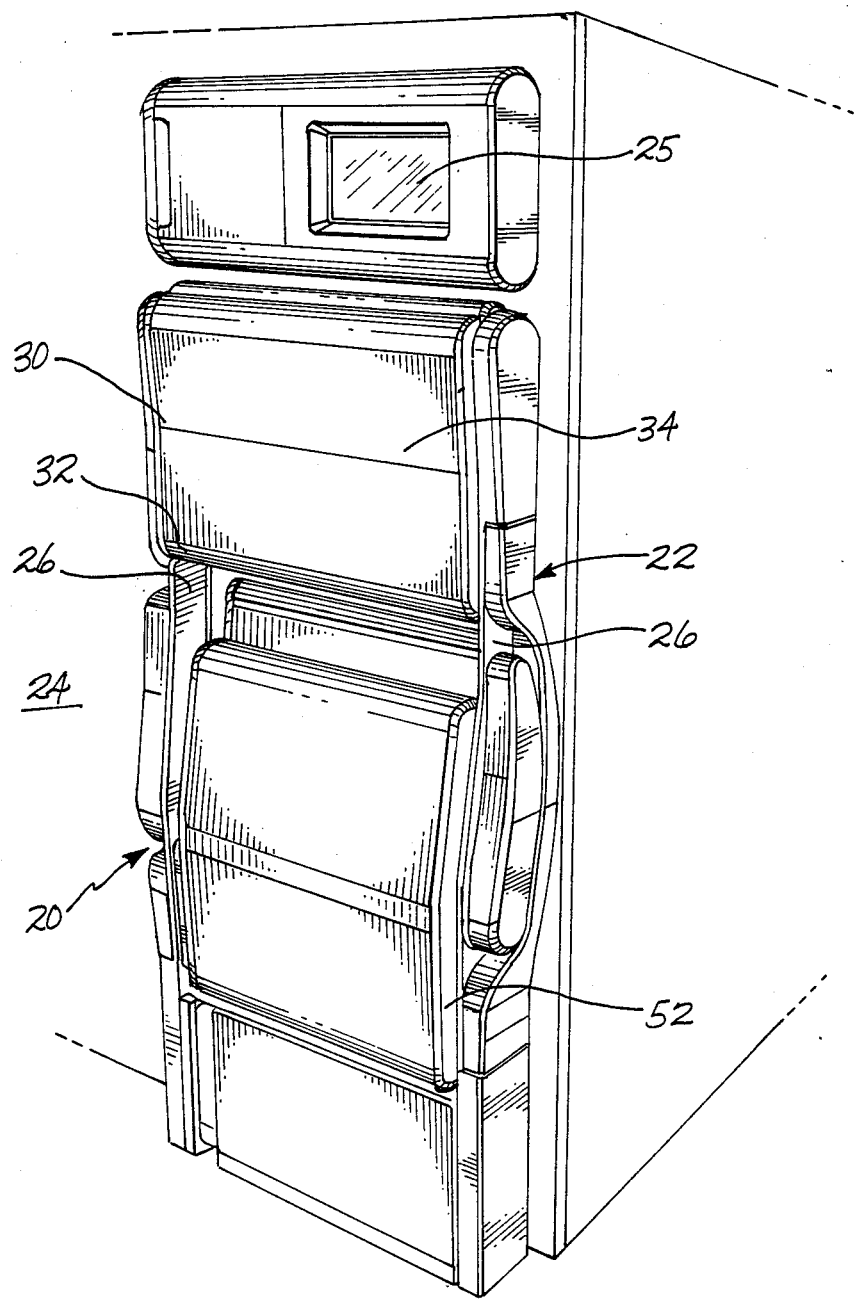
FIG. 1 an isometric view of an exemplary embodiment of a flight attendant's convertible workstation which is in a stowed mode.
Figure 2:
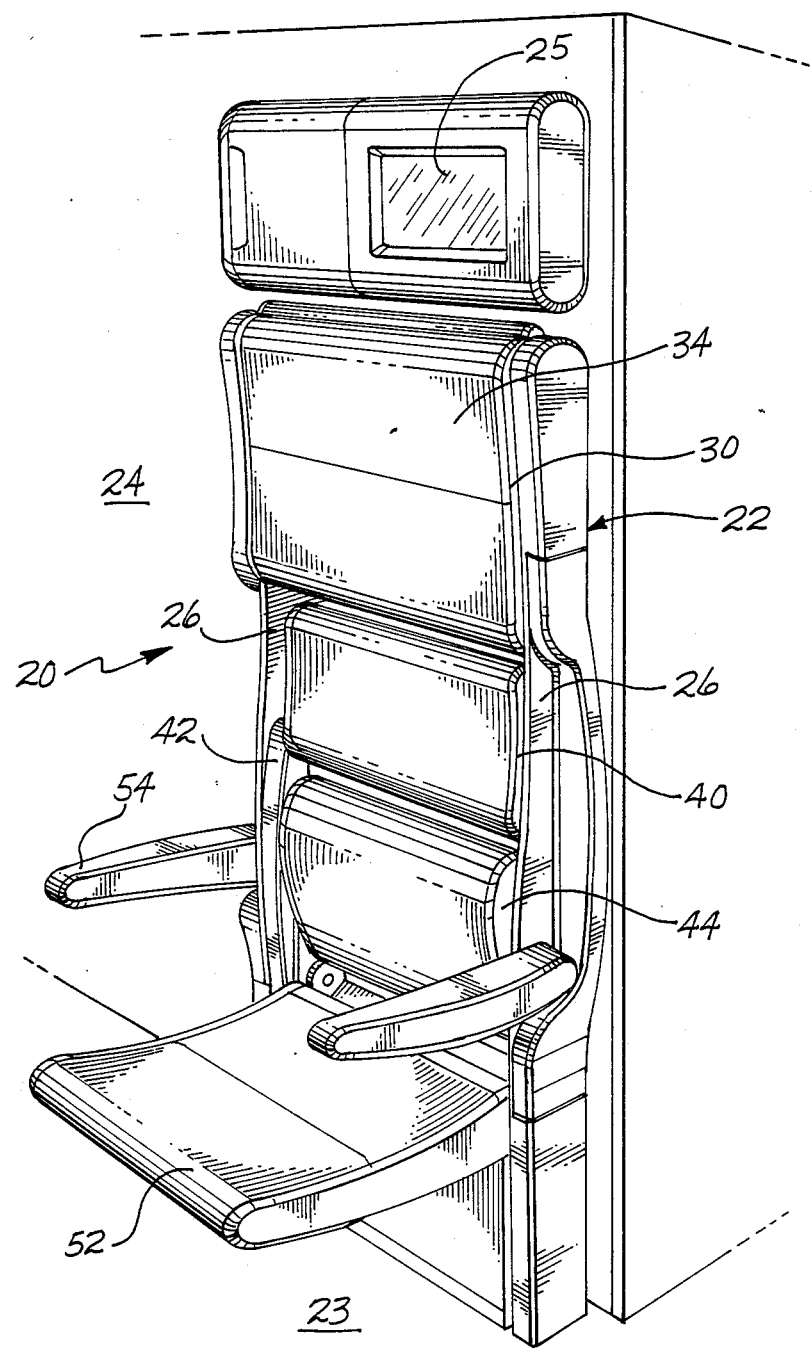
FIG. 2 is an isometric view of the workstation in a seating mode.
Figure 3:
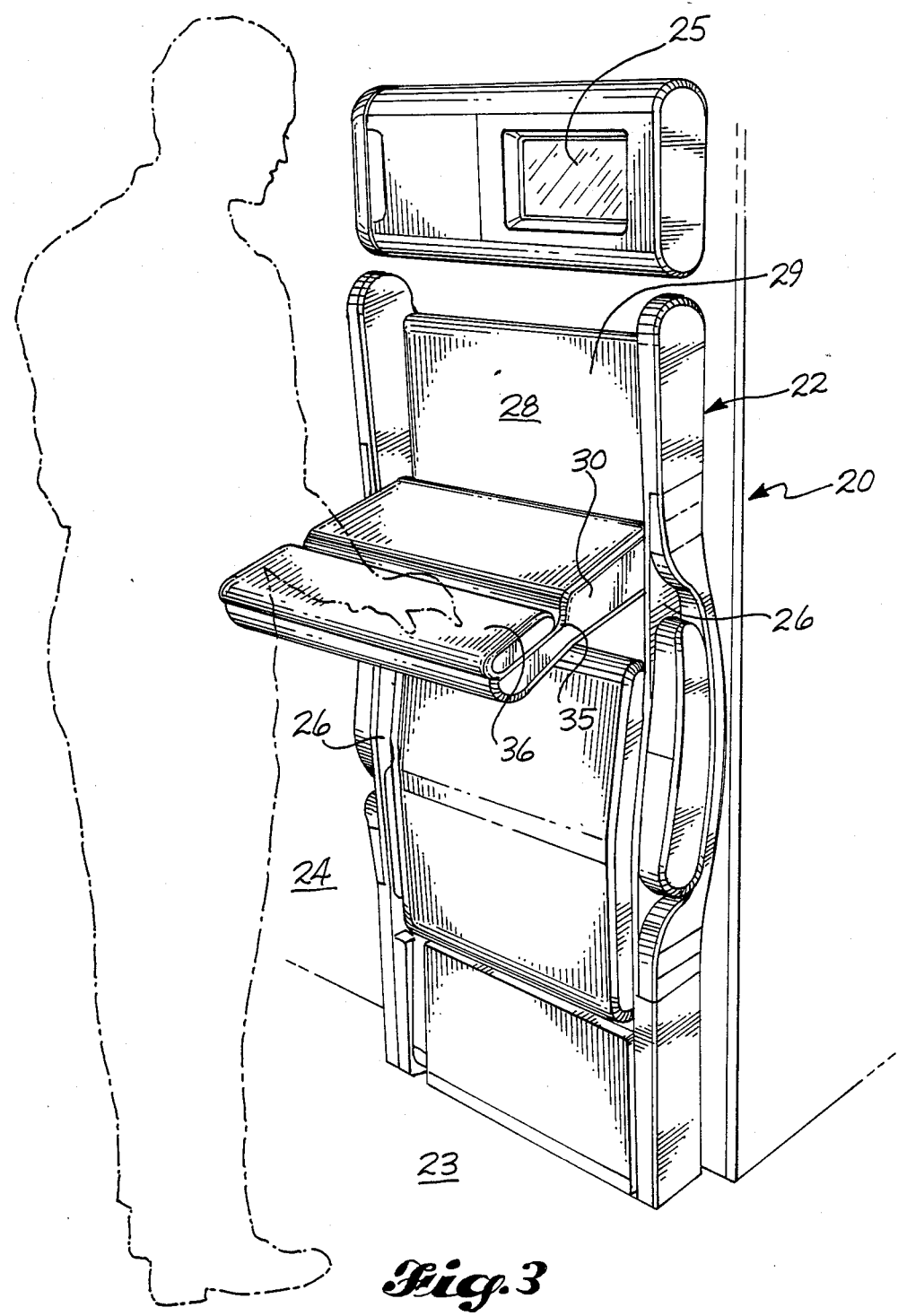
FIG. 3 is an isometric view of the workstation in a computer terminal mode wherein provision is made for an operator in a standing position.
Figure 4:
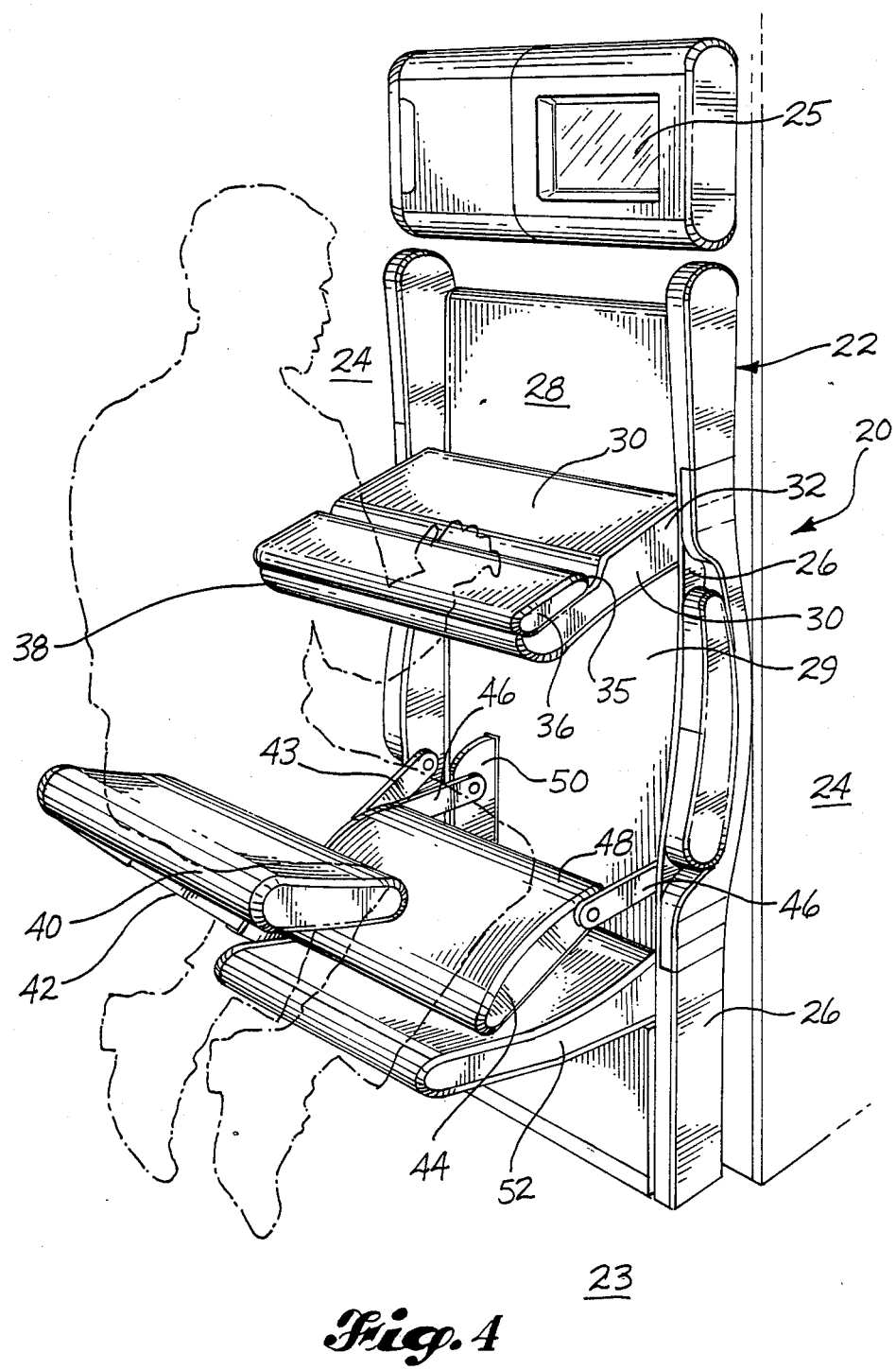
FIG. 4 is an isometric view of the workstation in a computer terminal mode wherein provision is made for an operator in a seated position.

Referring generally to FIGS. 1 through 4, there is generally indicated at 20 a flight attendant's workstation which is convertible between (i) a stowed mode shown in FIG. 1, (ii) a seating mode shown in FIG. 2, (iii) a computer terminal standing mode shown in FIG. 3 (where provision is made for a standing operator), and (iv) a computer terminal seated mode shown in FIG. 4 (where provision is made for a seated operator).

The workstation 20 (FIG. 1) includes a vertical frame indicated at 22 which is supported on a floor 23 of the aircraft inside the cabin. The frame 22 is attached at its rear side to a bulkhead 24 of the aircraft. Located a few inches above the top of the frame 22 is a computer display screen 25 which is attached to the bulkhead 24. The frame 22 includes a pair of upstanding side supports 26 (FIG. 4) which are connected at their rear ends to a rear wall 28 of the frame. The side supports 26 and rear wall 28 form a three-sided enclosure 29 which is open at the front in order to stow a number of movable components (to be described later) of the workstation and to allow these components to swing outward from the enclosure 29 for use by a flight attendant or computer terminal operator.

More specifically, the workstation 20 includes an upper panel 30 which is pivotly connected at its lower end 32 to the side supports 26. This permits the panel 30 to pivot between a vertical position inside the enclosure as shown in FIGS. 1 and 2, and a substantially horizontal position as shown in FIGS. 3 and 4.

One side of the panel 30 includes a head cushion 34 (FIG. 1) which faces vertically outward from the workstation when the panel 30 is in the vertical position. The other side of the panel 30 includes a receptacle 35 (FIG. 4) for mounting thereon a computer keyboard 36. The receptacle 35 is located at an outer end 38 of the panel 30 and is in a substantially horizontal position for convenient use by an operator when the panel is swung down from its stowed position. The panel 30 is supported in the horizontal position by stop lugs (not shown) attached to the inner sides of the side supports 26.

Located below the upper panel 30 in the stowed position is an upper intermediate panel 40 (FIG. 2) which is cushioned on both sides. In the stowed position, the panel 40 is vertically aligned with the panel 30 inside the enclosure 29. In this manner the outward facing cushioned side of the panel 40 provides shoulder support when a flight attendant is seated. When the panel 40 is swung down and out from the stowed position to a substantially horizontal position shown in FIG. 4, the cushioned side of the panel 40 provides a seat for use by the computer operator. As shown in FIG. 4, the panel 40 is supported by a single cantilvered arm 42 which is pivotally connected at one end to the inside of the side support 26, and which is pivotally connected at its opposite end to the side of the seat panel 40. Supporting the arm 42 is another arm 43, one end of which is pivotally connected to the inner surface of the left side support 26, and the other end which is pivotally connected to the arm 42. The seat panel 40 is supported in the horizontal position by stop lugs (not shown) which are attached to the arms 40 and which engage the bottom of the seat panel.

Located below the upper intermediate panel 40 is a lower intermediate panel 44 (FIG. 2) which is cushioned on the outward facing side. In the stowed position, the panel 44 is vertically aligned with the upper intermediate panel 40 inside the enclosure 29. In this manner the outward facing cushioned side of the panel 44 provides lumbar support for a seated flight attendant. When the panel 44 is swung down and out from the stowed position to a position where the outer end of the panel 44 is about thirty degrees below the horizontal as shown in FIG. 4, the cushioned side of the panel 44 provides a knee rest for a person seated at the computer keyboard. The knee panel 44 is supported by a pair of parallel arms 46 which are pivotally connected at one set of ends to the sides of the panel 44.

In order to attach the left arm 46 to the frame, a vertical flange 50 is connected to the rear wall 28 inboard of and parallel to the left side support 26. The end of the left arm 46 is pivotally connected to flange 50 whereas the end of the right arm 46 is pivotally connected to the right side support 26. In the extended position, the arms 46 are supported in a generally horizontal manner by stop lugs 51 which are attached to the inner sides of flange 50 and right side support 26. The front edge of the knee panel 44 is supported on the top surface of a flight attendant's seat 52 so that the knee panel inclines downward toward the seated individual.

As shown in FIG. 4, the arms 46 of the knee panel are somewhat shorter than the arm 42 of the seat panel 40 in order to position the knee panel 44 a short distance from the rear wall 28 for supporting the knees. The seat panel 40 is positioned at a greater distance from the rear wall 28 in order to provide a seat for the computer operator.

Located below the knee panel 44 (FIG. 4) is the flight attendant's seat 52 which at its lower end is pivotally connected to the side supports 26 of the frame. In the stowed position illustrated in FIG. 1, the seat 52 is positioned vertically inside the enclosure 29 in front of the panels 40, 44. However, when the seat 52 is swung down to a horizontal position shown in FIG. 2, it is ready for use by a flight attendant. In this mode the panels 30, 40, and 44 are in their stowed positions to provide support for the flight attendant's back and head. Support for the seated attendant's arms is provided by a pair of arm rests 54 which are attached to the outsides of the frame side supports 26 about six or eight inches above the pivot axis of the seat 52. In the stowed position shown in FIG. 1, the arm rests 54 are vertically aligned with the side supports 26, whereas in the seating mode shown in FIG. 2, the arm rests 54 are generally parallel to the floor of the cabin.

Operationally, the workstation 20 occupies a small amount of space when in the stowed position shown in FIG. 1. This is because the aforementioned elements are stowed vertically inside the enclosure 29. In order to use the workstation for seating a flight attendant, the seat 52 and arm rests 54 are swung down from their stowed vertical positions to the horizontal positions shown in FIG. 2. Conversion of the workstation for use by a standing computer operator requires that the seat 52 and arm rests 54 be raised to the vertical position, and the head panel 30 be swung down to a generally horizontal position as shown in FIG. 3.

To convert the workstation for use by a seated computer operator, the seat 52 is first lowered, and the panels 40, 44 are then lowered to their extended positions shown in FIG. 4.

Figure 5:
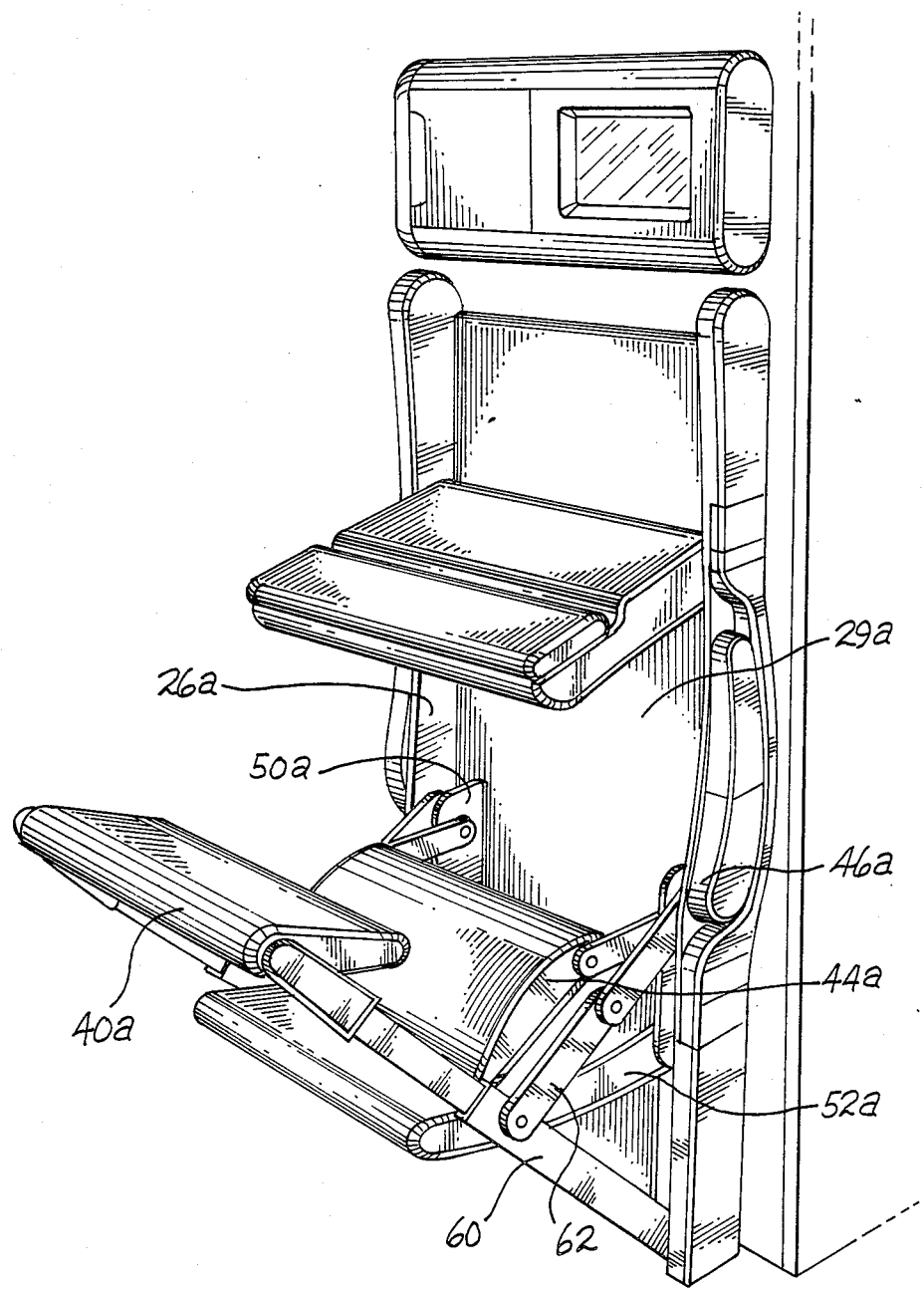
FIG. 5 is an isometric view of another embodiment of the workstation in a seated computer terminal mode.

In an alternate embodiment shown in FIG. 5, like elements described previously are identified by like numerals with the suffix "a" attached. In this embodiment, different linkages are used to support the seat panel 40a. That is, a pair of telescoping arms 60 are pivotly connected at one set of ends to the insides of the side supports 26a at locations adjacent to the cabin floor 23a. At their opposite ends, the arms 60 are pivotly connected to the sides of the panel 40a. In order to support the seat panel 40a in a substantially horizontal position as shown in FIG. 5, each of the arms 60 is supported at approximately a forty five degree angle by a pair of interlocking arms 62, 63. The arms 62, 63 are pivotly connected to each other, with the arms 62 being pivotly connected to the middle of the arms 60, and the arms 63 being pivotly connected to the insides of the side supports 26a. In order to place the panel 40a in the stowed position, the telescoping arms 60 are collapsed to their minimum lengths, and the arms 60 are raised upward and into the enclosure 29a with the interlocking arms 62, 63 also pivoting into the enclosure 29a.

Alternatively, the arms 62, 63 may be replaced by a U-shaped brace (not shown) which is pivotly connected to the arms 60 and which is supported on the floor of the aircraft.

What is claimed is:

1. A multi-function workstation for an aircraft cabin, the workstation comprising:
   a. a frame which forms an enclosure;
   b. a first panel which is attached to a lower part of the frame for movement between a generally vertical stowed position inside the frame enclosure, and a generally horizontal position for use as a seat in a first functional mode;
   c. a second panel which is attached to the frame above the first panel for movement between a generally vertical stowed position inside the frame enclosure, and a generally horizontal position, the second panel including (i) a cushion on a first side to act as a headrest when the second panel is in the generally vertical stowed position during the first functional mode, and (ii) a receptacle for supporting a computer keyboard on a second side of the second panel so that the keyboard is supported in a generally horizontal manner when the second panel is in the generally horizontal position for use of the keyboard by a computer operator in a second functional mode;
   d. a third panel for accomodating the computer operator at the keyboard receptacle in a seated position; and
   e. means for connecting the third panel to the frame below the second panel in a manner that the third panel is movable between a generally vertical stowed position inside the frame enclosure, and a generally horizontal position in which the third panel is spaced further away from the frame than the second panel in order to seat the operator on the third panel when accessing the keyboard receptacle in the second functional mode.

2. The workstation as set forth in claim 1 additionally comprising:
   a. a fourth panel for supporting knees of the operator when seated upon the third panel; and
   b. means for connecting the fourth panel to the frame in a manner that the fourth panel is movable between a generally vertical stowed position inside the frame enclosure, and a generally horizontal position in which the fourth panel is spaced closer to the frame than the third panel to permit supporting the operator's knees on the fourth panel in the second functional mode.

3. The workstation as set forth in claim 2 additionally comprising a computer display screen which is supported above the frame for use by the computer operator in the second functional mode.

4. The workstation as set forth in claim 3 wherein the third panel connecting means and the fourth panel connecting means each include means for connecting the third and fourth panels to the frame so that the third and fourth panels are located behind the first panel when the first panel, third panel and fourth panel are in the vertical stowed positions inside the frame enclosure.

5. The workstation as set forth in claim 4 wherein the second panel connecting means, third panel connecting means and fourth panel connecting means each include means for connecting the second, third and fourth panels to the frame so that fourth panel is vertically aligned below the third panel which in turn is vertically aligned below the second panel when the second, third and fourth panels are in the vertical stowed positions.

6. The workstation as set forth in claim 5 wherein:
   a. the frame includes first and second upstanding supports; and
   b. the second panel connecting means, third panel connecting means and fourth panel connecting means each include means for connecting the second, third and fourth panels to the first and second upstanding supports so that the second panel, third panel and fourth panel are vertically aligned with the first and second upstanding supports when in the vertical stowed positions.

* * * * *